(No Model.)

J. W. DEAN.
GATE OPERATING MECHANISM.

No. 604,308. Patented May 17, 1898.

Witnesses.
Robert Garrett
J. B. Keefer

Inventor.
John W. Dean.
By James L. Norris.
Atty.

UNITED STATES PATENT OFFICE.

JOHN WILLIAM DEAN, OF WINCHESTER, KENTUCKY.

GATE-OPERATING MECHANISM.

SPECIFICATION forming part of Letters Patent No. 604,308, dated May 17, 1898.

Application filed February 10, 1898. Serial No. 669,815. (No model.)

*To all whom it may concern:*

Be it known that I, JOHN WILLIAM DEAN, a citizen of the United States, residing at Winchester, in the county of Clark and State of Kentucky, have invented new and useful Improvements in Gate-Operating Mechanism, of which the following is a specification.

My invention relates to improvements in gate-operating mechanism, designed more particularly for application to that style of swinging gate usually placed across driveways at the entrance to farms or private grounds.

The object of my invention is to provide improved means for opening and closing a gate which may be operated at a distance by one approaching the gate on horseback or in a vehicle without the necessity of dismounting from the horse or leaving the vehicle for that purpose.

A further object of the invention relates to improved means for holding the gate in an open or closed position.

Other objects of the invention relate to certain details of construction, all of which will more fully hereinafter appear.

Figure 1:
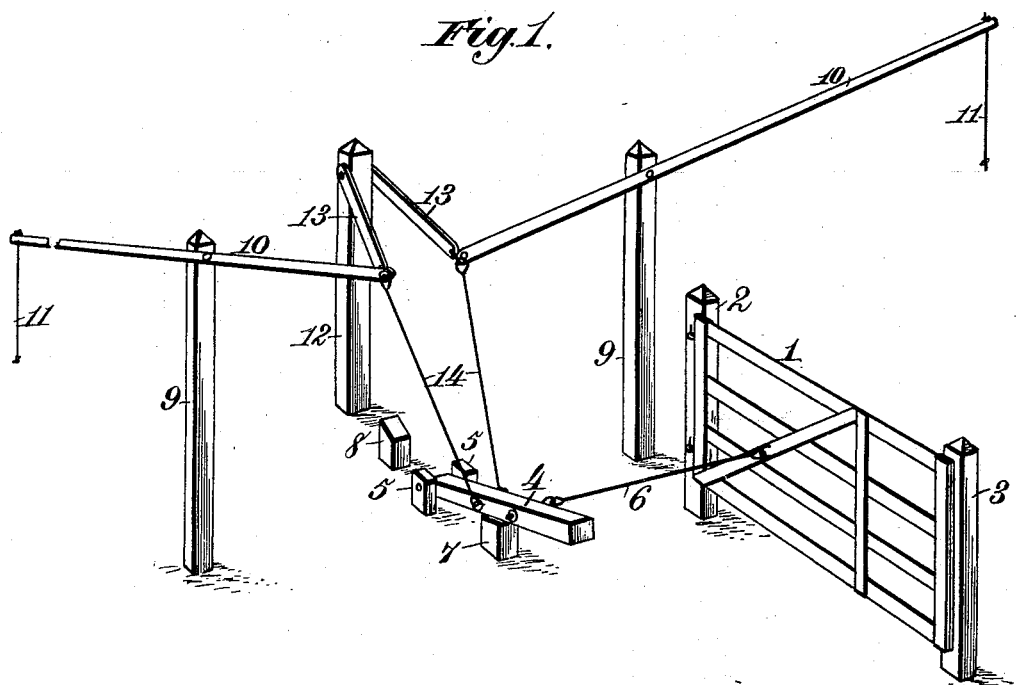
Figure 2:
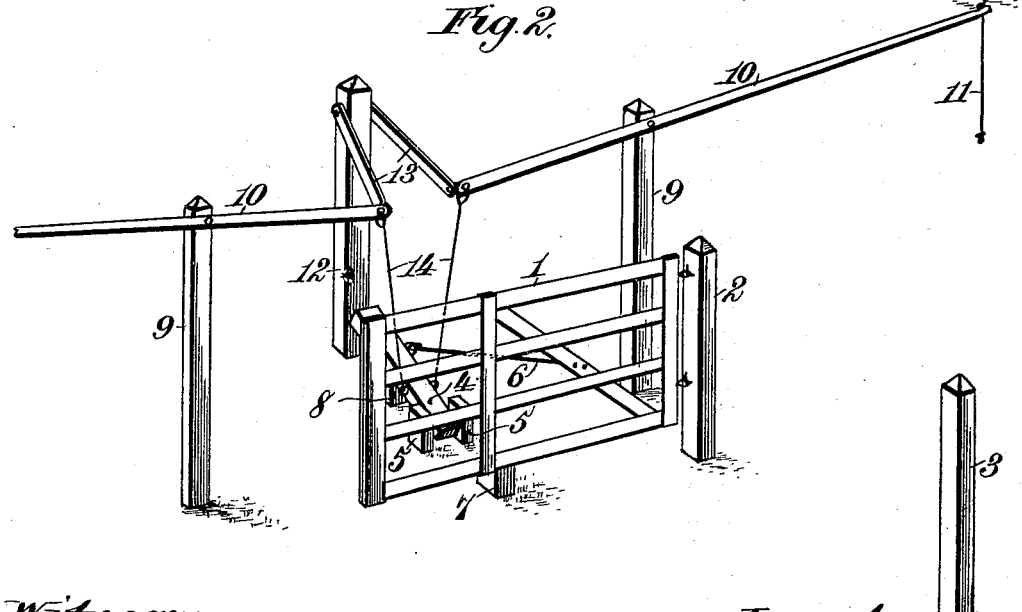

In the accompanying drawings, illustrating my invention, Figure 1 is a perspective view illustrating the position of parts with the gate in its closed position, and Fig. 2 is a like view with the gate in its open position.

The reference-numeral 1 indicates the gate, 2 the post upon which it is pivotally supported, and 3 the post against which it closes.

The numeral 4 indicates a beam the lower end of which is pivotally supported in two standards 5, driven into the ground a suitable distance from the gate. The beam 4 is connected toward its outer end to the gate by means of an iron or other rod 6. When the gate is in its closed position, the beam 4 is designed to rest upon a short post 7, driven into the ground, and when the gate is in its open position said gate will rest upon a similar post 8. On the side toward which the gate opens and at a considerable distance from the gate is located a post 9 in line with a similar post 9 adjacent to the gate. On the upper end of each post 9 is pivotally supported a long lever-arm 10, each of which, at its outer end, is provided with a rope 11 for operating the same.

The numeral 12 indicates a post located midway of the posts 9, but farther removed from the driveway than said posts. On either side of said post 12, at its upper end, are pivotally supported the ends of two rods 13, which at their outer ends are pivotally connected, respectively, to the inner ends of the lever-arms 10. The inner ends of the lever-arms 10 are pivotally connected to the beam 4 by means of connecting-rods 14, the point of connection of which with the beam 4 is toward the rear or lower end of the same. Similarly the point of connection of rod 6 with the gate is toward the rear end of the gate.

The operation is as follows: A person approaching the gate from either side desiring to open it draws down a lever-arm 10 by means of pulling either cord 11. This will operate through the medium of connecting-rods 14 to raise the beam 4, which in turn will operate to open the gate through the medium of connecting-rod 6. The point of pivotal connection of the rods 14 with beam 4 and of rod 6 with the gate 1 is such that considerable momentum is imparted to the outer ends of said gate and beam, respectively, and hence in the opening operation said beam will be raised and thrown past the center of gravity and will descend and rest upon the post 8, thereby holding the gate open. This will cause the outer ends of lever-arms 10 to be raised to their normal position. After the person operating the gate has passed through the same he draws down the other lever-arm 10, when the beam 4 will be raised and thrown over to rest upon the post 7, thereby closing the gate. The rods 13, connecting lever-arms 10 with the post 12, serve to steady said lever-arms and to prevent lateral strain upon their pivot-bearings on the posts 2 and 9, whereby said lever-arms will move freely and smoothly in a vertical plane.

Having thus described my invention, what I claim as new is—

1. In combination with the gate-post 2, having a gate mounted thereon, the posts 9 having pivotally supported thereon the lever-arms 10, a post, 12, located between the posts 9, rods pivotally connected to said post and to the inner ends of said lever-arms, a beam pivotally supported at its lower end between the posts 9 and in line with the post 12, rods pivotally connecting the inner ends of said lever-arms with said beam and a rod connecting the outer end of said beam with the gate, substantially as described.

2. In combination with the gate-post 2 having a gate mounted thereon, the posts 9 having pivotally supported thereon the lever-arms 10, a post 12 located between the posts 9, rods pivotally connected to said post and to the inner ends of said lever-arms, a beam pivotally supported at its lower end between the posts 9 and in line with the post 12, rods pivotally connecting the inner ends of said lever-arms with said beam, and being connected with said beam toward its lower end, a rod connecting the outer end of said beam with the gate, and being connected with the gate toward its rear end, and the posts 7 and 8, the combination operating in the manner set forth.

In testimony whereof I have hereunto set my hand in presence of two subscribing witnesses.

JOHN WILLIAM DEAN.

Witnesses:
F. H. JACKSON,
W. H. GAMER.